US006305829B1

(12) United States Patent
Thomas et al.

(10) Patent No.: US 6,305,829 B1
(45) Date of Patent: Oct. 23, 2001

(54) HEAT CONDUCTING MULTI POSITION REFLECTOR NECK ASSEMBLY

(75) Inventors: Eric P. Thomas, Little Compton, RI (US); Brian R. Roberge, Allston, MA (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 09/608,386

(22) Filed: Jun. 30, 2000

(51) Int. Cl.[7] .......... B60Q 1/00

(52) U.S. Cl. .......... 362/519; 362/294; 362/345; 439/699.2

(58) Field of Search .......... 362/519, 294, 362/345, 226, 443; 439/699.2, 242, 611, 612, 602

(56) References Cited

U.S. PATENT DOCUMENTS 3,248,535 4/1966 Docimo et al. .
3,313,931 4/1967 Klugman .
4,841,422 * 6/1989 Groh .......... 362/294
5,029,057 * 7/1991 Devir et al. .......... 362/226
5,222,800 6/1993 Chan et al. .
5,236,157 8/1993 Reggiani .
5,257,172 * 10/1993 Erickson .......... 362/226
5,422,795 * 6/1995 Liu .......... 362/96
5,457,617 10/1995 Chan et al. .
5,548,499 8/1996 Zadeh .
5,720,548 * 2/1998 Geary .......... 362/260
5,934,791 * 8/1999 Van Gennip et al. .......... 362/226
5,967,650 * 10/1999 Laughlin .......... 362/396
6,065,855 * 5/2000 Hwang .......... 362/294

* cited by examiner

*Primary Examiner*—Thomas M. Sember
*Assistant Examiner*—Jacob Choi
(74) *Attorney, Agent, or Firm*—Jeffrey A. Haeberlin; Middleton Reutlinger

(57) ABSTRACT

A neck assembly for a recessed lighting fixture is provided that allows for the dissipation of heat from the fixture to the atmosphere and provides for the use of lamps of various sizes within the fixture. The neck assembly includes a generally annular neck portion that includes a body portion; and, a socket subassembly that includes a U-shaped socket support and lamp socket. The neck portion includes an axial hole or opening therein and may also include one or more nonaxial holes or openings therein. The nonaxial holes or openings may be circular, oblong or some other similar shape. The neck portion also contains two or more pairs of slots or openings. These slots are configured so as to removably receive the ends of the legs of the U-shaped socket support.

6 Claims, 2 Drawing Sheets

HEAT CONDUCTING MULTI POSITION REFLECTOR NECK ASSEMBLY

BACKGROUND OF THE INVENTION

1. Field of the Invention

The invention relates generally to electrical lighting fixtures and more particularly to reflector neck assemblies for recessed lighting fixtures.

2. Description of the Related Art

Current recessed lighting fixtures, while optimizing the focal length of the lamps in relation to the reflector of the fixture, contain socket assemblies that do not adjust to accommodate lamps of various sizes. Additionally, many lighting fixtures that include reflectors also experience unacceptably high surface temperatures at the flange and at the top of the fixture housing. The need to limit the surface temperature of the outer edge of the reflector flange has necessitated the limiting of the power ratings of lamps used in current recessed lighting fixtures. Current recessed lighting fixtures also fail to fully utilize the space within the ceiling or recessed area to help dissipate the heat generated within the fixture. Instead, the heat generated by the fixture tends to be conducted to the outer rim of the reflector flange, where it may cause a safety hazard. Additionally, the ability to dissipate heat from the fixture allows for a brighter, more powerful lamp to be used within the fixture than would otherwise be possible. Thus, there is a need for a neck assembly that allows for the easy repositioning of the socket within the light fixture, thereby accommodating lamps of various sizes as well as a means for lowering the surface temperature of the outer rim of the reflector flange and utilizing the space within the ceiling above the recessed fixture for heat dissipation.

SUMMARY OF THE INVENTION

It is an object of the present invention to provide a neck assembly for a recessed lighting fixture that allows for the dissipation of heat from the area surrounding the fixture to the interior of the fixture and the recessed portion of the ceiling or wall.

It is another object of the present invention to provide a neck assembly that allows for the facile repositioning of the socket within the recessed lighting fixture to adjust the focal length of the lamp.

It is a further object of the present invention to provide an adjustable neck assembly that allows for the use of different sized lamps within the fixture.

More particularly, the present invention provides a neck assembly for a recessed lighting fixture comprising: a generally annular neck portion that includes a body portion and a socket subassembly that includes a U-shaped socket support and lamp socket. The neck portion includes an axial hole or opening therein and may also include one or more nonaxial holes or openings therein. The nonaxial holes or openings may be circular, oblong or some other similar shape. The neck portion also contains two or more pairs of slots or openings. These slots are configured so as to removably receive the ends of two legs of the U-shaped socket support. These slots are aligned diametrically opposite each other within the body portion and run through the neck portion parallel to the axial hole therein. The slots may be contained within two or more pairs of shoulders that are also included within the body portion. Each pair of shoulders contains one pair of slots. The shoulders are aligned within different planes that run perpendicular to the axis that runs through the axial hole within the body portion. The body portion may be made by a metal casting process, injection molding or similar manufacturing operation well known in the art. The body portion may be made of metal, such as aluminum, ceramic, plastic, composite or similarly appropriate material. The body portion may be unitary or formed from two or more parts.

The U-shaped socket support comprises the two aforementioned legs and a crossbar. The U-shaped socket support may be formed of a resilient material such as metal, for instance, aluminum, or plastic. Each leg may contain one or more bends therein that perform a locking function when the U-shaped socket support is positioned within a pair of slots. Attached to the crossbar of the U-shaped socket support is a lamp socket that is well known in the art.

DESCRIPTION OF THE PREFERRED EMBODIMENT

Figure 1:
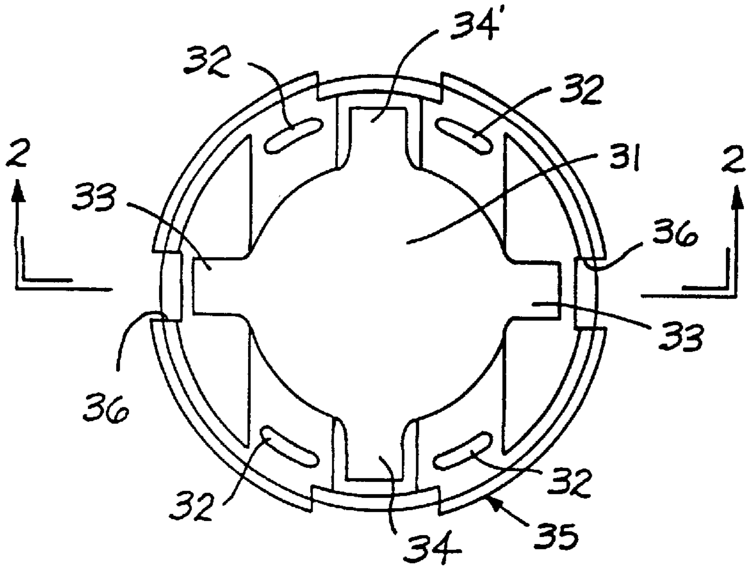
FIG. 1 is a top view of the neck portion of the neck assembly of the present invention.
Figure 3:
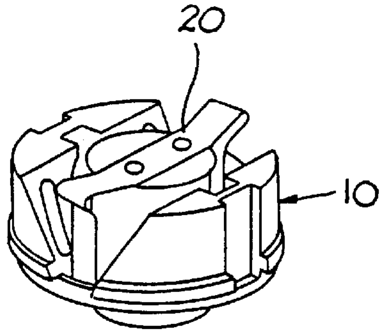
FIG. 3 is a perspective view of the neck assembly of the present invention in a lowered position.
Figure 4:
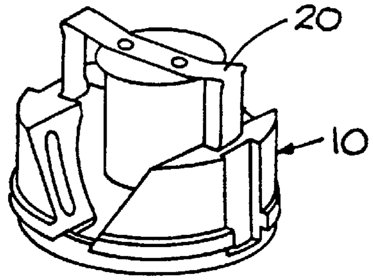
FIG. 4 is a perspective view of the neck assembly of the present invention in a raised position.
Figure 5:
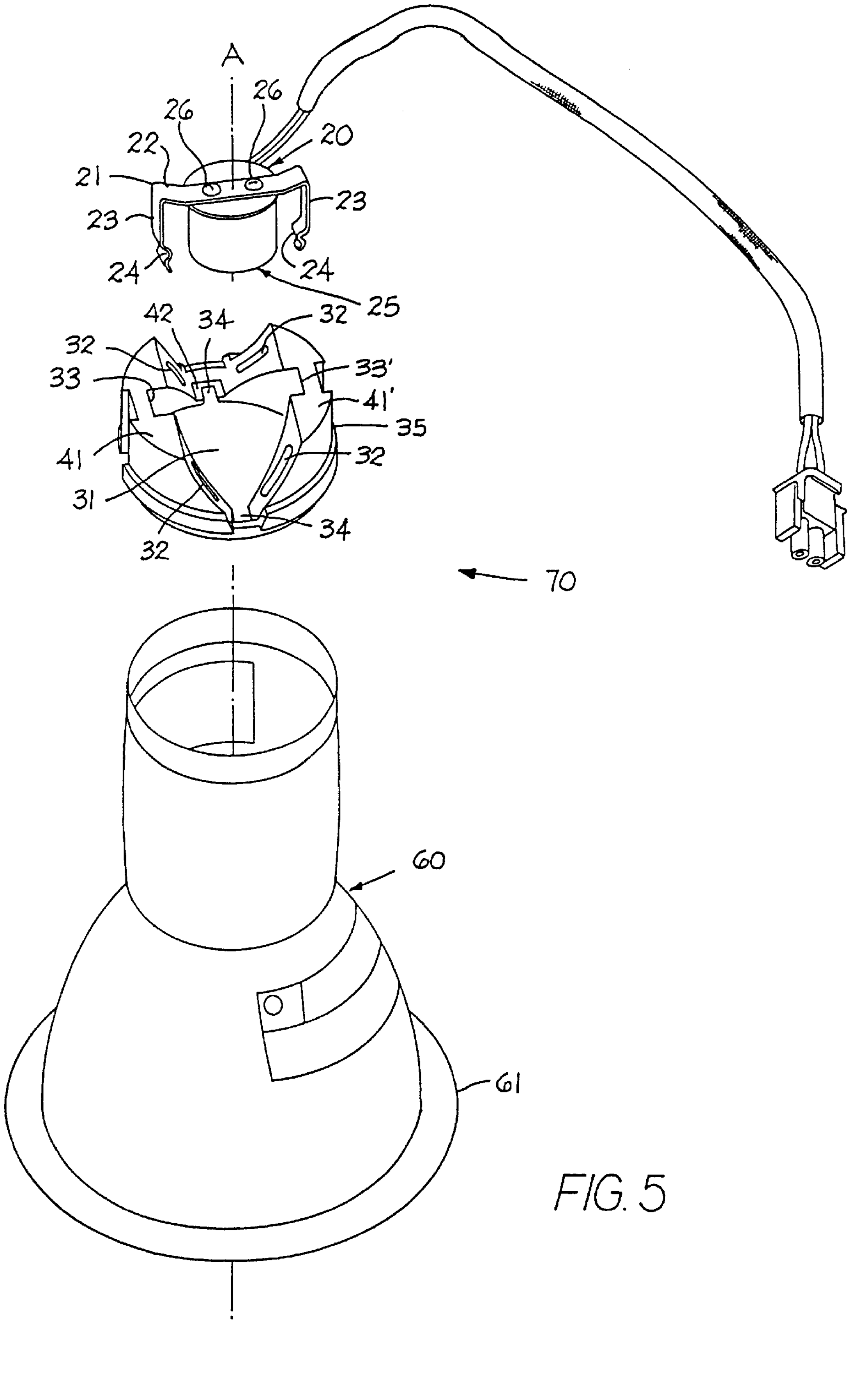
FIG. 5 is an exploded view of a lighting fixture that includes the neck assembly of the present invention.

As shown in FIGS. 3–5, a neck assembly 10 of the present invention is provided with a socket subassembly 20 and a body portion 35. FIG. 1 shows the body portion 35 of the present invention as an annular ring. Body portion 35 may be configured into any suitable shape, such as a polyhedral or the like, so as to properly function within a lighting fixture. Body portion 35 contains an axial hole or opening 31. A lamp, not shown, may be disposed through said axial opening 31 when the lighting fixture is assembled. In FIG. 1, axial opening 31 is shown surrounded by a plurality of nonaxial openings 32 that extend through the body portion 35 parallel to the axial opening 31, although they may also extend perpendicular to axial opening 31 as well. The body portion 35 may include one or more nonaxial heat radiating openings 32 that may be oblong, as shown in FIG. 1, or any other suitable shape. Axial opening 31 and heat radiating openings 32 function as pathways for heat generated by the fixture to travel between the reflector area and the area above the socket within the recess.

FIG. 1 also shows two pairs of slots 33/33' and 34/34'. Slots 33 and 33' are aligned diametrically opposed to each other within the body portion 35 and are the slots used when the lamp is placed in the upper position. Slots 34 and 34' are similarly aligned are the slots used when the lamp is placed in the lower position. The slots 33, 33', 34 and 34' extend through body portion 35. The slots may be rectangular in shape, as shown in FIG. 1, or any other shape that will receive and engage legs 23. The slots may have only one opening or openings at both ends of the slots. Body portion 35 may contain two or more pairs of slots that are similarly aligned. Cavities 36 and 36' are provided in the outer edge of body portion 35. Reflector 60 may be attached to body portion 35 by inserting portions of reflector 60 within cavities 36 and 36'.

Figure 2:
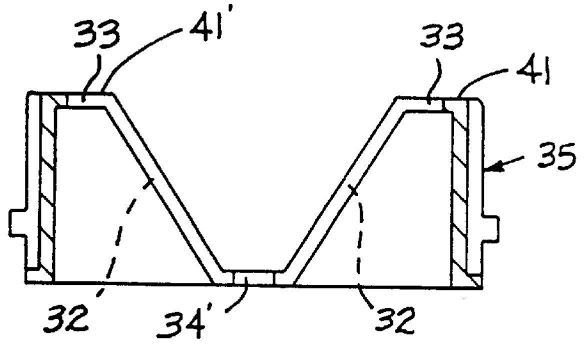
FIG. 2 is a sectional view of the neck portion of the present invention taken along line 2—2 of FIG. 1.

FIG. 2 is a sectional view of the body portion 35 of the present invention. Shoulder pairs 41/41' and 42/42' are disposed within the body portion 35, only shoulders 41, 41' and 42' being shown FIG. 2. Shoulder pair 41/41' is aligned in a different plane than that in which shoulder 42' is aligned. These two planes are parallel to each other but perpendicular to vertical axis A.

FIG. 5 shows the axial alignment of slot pairs 33/33' and 34/34' within body portion 35, with 34' in phantom lines. Slot pair 33/33' is disposed within a plane that is perpendicular to axis A and slot pair 34/34' is disposed within another plane that is also perpendicular to axis A. That is, each slot pair disposed within body portion 35 is disposed within a different plane that is perpendicular to axis A. In this embodiment, body portion 35 includes shoulder pairs 41/41' and 42/42', with 42' shown in ghost outline. Slot pair 33/33' is disposed within shoulder pair 41/41', and slot pair 34/34' is disposed within shoulder pair 42/42'. Body portion 35 may include more than two shoulder pairs.

FIG. 5 also shows socket subassembly 20 that includes a U-shaped socket support 21 and a socket 25. U-shaped socket support 21 includes legs 23, bends 24 and crossbar 22. Socket 25 is fixedly attached to U-shaped socket support 21 by screws 26. It may also be attached by similarly appropriate means such as adhesive or may be integrally formed with U-shaped socket support 21. U-shaped socket support 21 is made of a resilient material such as metal or plastic. U-shaped socket support 21 is so configured as to apply a biasing force to the sides of the slots in which it is housed. This biasing force thereby maintains the U-shaped socket support 21 in engagement with said body.

In order to readjust the focal length of the lamp relative to the reflector 60 so as to ideally accommodate lamps of various sizes, socket subassembly 20, to which a lamp may be attached, may be repositioned within fixture 70. Socket subassembly 20 may be removed from the pair of slots 33 and 33' by applying inward pressure to legs 23 and pulling upward on socket subassembly 20. Socket subassembly 20 may be rotated 90° so as to align legs 23 with the openings of slots 34 and 34'. Legs 23 may then be inserted into slots 34 and 34' and the inward pressure on the legs removed. Once the inward pressure is removed, legs 23 will be biased outward. Bends 24 will then engage the sides of slots 34 and 34' so that socket subassembly 20 remains engaged to body portion 35 through slots 34 and 34' until inward pressure is again applied to legs 23 and the socket subassembly 20 is pulled upward from the body portion 35.

During operation of the lighting fixture, energy in the form of heat radiates from lamp socket 50 and reflector 60. Axial opening 31 and nonaxial openings 32 allow this heat generated within the lighting fixture to radiate from the reflector area of the fixture through the neck portion 30 to the area around the socket and beyond it within the recessed space that is partially or completely occupied by the lighting fixture 70. The transfer of heat away for the reflector 60 thereby reduces the surface temperature of reflector flange 61.

While the invention has been found in one preferred embodiment in respect to the design of a neck portion of a recessed lighting fixture, it is apparent that various modifications can be made to the present invention without departing from the spirit or scope of the invention as set forth in he claims appended hereto.

What is claimed is:

1. An neck assembly for a lighting fixture comprising:

(a) a body portion having an axial opening therein, and at least two pairs of slots, each slot being aligned diametrically opposite the other slot of each said pair, and each said pair of slots being disposed in a different plane that is perpendicular to the axis of said body portion; and, (b) a lamp socket subassembly comprising:

a U-shaped lamp socket support including two legs that are removably disposed within one of said pairs of slots within said neck portion, and a lamp socket attached to said U-shaped lamp socket support for receiving a lamp.

2. The neck assembly of claim 1, including at least one heat radiating opening in said body.

3. The neck assembly of claim 2, wherein said heat radiating opening is oblong.

4. The neck assembly of claim 1 being metal.

5. The neck assembly of claim 4, wherein said metal is aluminum.

6. The neck assembly of claim 1 being plastic.

* * * * *